United States Patent
King et al.

(10) Patent No.: US 11,332,596 B2
(45) Date of Patent: May 17, 2022

(54) TREATED POROUS MATERIAL

(71) Applicant: Dow Global Technologies LLC, Midland, MI (US)

(72) Inventors: Stephen W. King, League City, TX (US); Xue Chen, Manvel, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 455 days.

(21) Appl. No.: 16/334,613

(22) PCT Filed: Sep. 28, 2017

(86) PCT No.: PCT/US2017/054005
§ 371 (c)(1),
(2) Date: Mar. 19, 2019

(87) PCT Pub. No.: WO2018/064330
PCT Pub. Date: Apr. 5, 2018

(65) Prior Publication Data
US 2021/0277201 A1    Sep. 9, 2021

Related U.S. Application Data

(60) Provisional application No. 62/401,965, filed on Sep. 30, 2016.

(51) Int. Cl.
| | | |
|---|---|---|
| *C08J 9/42* | (2006.01) |
| *B27K 3/15* | (2006.01) |
| *B27K 3/36* | (2006.01) |
| *C09D 171/02* | (2006.01) |
| *C08L 97/02* | (2006.01) |

(52) U.S. Cl.
CPC .......... *C08J 9/42* (2013.01); *B27K 3/15* (2013.01); *B27K 3/36* (2013.01); *C08L 97/02* (2013.01); *C09D 171/02* (2013.01); *C08J 2397/02* (2013.01); *C08J 2471/02* (2013.01)

(58) Field of Classification Search
None
See application file for complete search history.

(56) References Cited

U.S. PATENT DOCUMENTS

| 6,020,027 A | 2/2000 | Klosowski et al. |
| 7,255,869 B2 * | 8/2007 | Uchida .................. A61K 8/19 |
| | | 424/401 |
| 8,252,426 B2 | 8/2012 | Hayward et al. |
| 2011/0091575 A1 * | 4/2011 | Hayson .................. A01N 59/20 |
| | | 424/634 |

FOREIGN PATENT DOCUMENTS

| JP | 61076313 | 4/1986 |
| WO | 2001087560 | 11/2001 |
| WO | 2009078945 A2 | 6/2009 |
| WO | 2011042609 | 4/2011 |
| WO | 2016018765 | 2/2016 |

OTHER PUBLICATIONS

Stamm, A.J., "The Dimensional Stability of Wood," Forest Products Journal, 1959, p. 375-381, v. IX, No. 10, Forest Products Research Society, Madison, Wisconsin.

* cited by examiner

Primary Examiner — Tae H Yoon

(57) ABSTRACT

A treated cellulosic material comprising: a cellulosic material having a porous structure defining a plurality of pores, the cellulosic material comprising wood including wood or wood composite materials, at least a portion of the pores containing a treating agent comprising: a polymer comprising a water soluble polyol; and a modifying agent comprising a hydrophobic polyalkylene polyol. A method for preparing a treated cellulosic material comprising: providing a cellulosic material; a first treatment protocol comprising impregnating the cellulosic material with a polymer, the polymer comprising a water-soluble polyol; and a second treatment protocol comprising impregnating the cellulosic material with a modifying agent, the modifying agent comprising a hydrophobic polyalkylene polyol.

6 Claims, No Drawings

TREATED POROUS MATERIAL

The following application is a rollout from PCT application PCT/US2017/054005 which claims priority from U.S. provisional application 62/401,965 having a filing date of Sep. 30, 2016.

BACKGROUND

Porous materials, such as cellulosic materials, need to be protected from insect attack, rot and water impregnation to help preserve the physical properties of the cellulosic material. One example of such a cellulosic material is wood. A variety of treatment agents and preservation methods are known to preserve cellulosic materials.

Modern preservation methods typically involve pressure treating the cellulosic material with a treating agent. Pressure treatment typically allows the treating agent to penetrate throughout the porous structure of the cellulosic material. The treating agent is typically a chemical compound selected to impart the desired physical properties to the cellulosic material. For example, treating agents that increase hardness, add water resistance and improve the dimensional stability of the cellulosic material are of interest. Wood is capable of absorbing as much as 100% of its weight in water which causes the wood to swell, which after loss of water through evaporation causes the wood to shrink. This process of water absorption/evaporation is non-uniform and creates internal stresses in the wood leading to splitting, warping, bowing, crooking, twisting, cupping, etc. Also, water can serve as a pathway for organisms that degrade the cellulosic material, such as insects or fungus. Treating agents that repel insects, or minimize the formation of fungi, or improve the overall durability of the cellulosic material are of interest. Further, treating agents can improve wind resistance, ultraviolet radiation resistance, stability at high and low temperatures, pest resistance, fire resistance and other issues which might affect the physical properties of the cellulosic material.

An improved treating agent for cellulosic materials is desired.

SUMMARY

A treated cellulosic material comprising: a cellulosic material having a porous structure defining a plurality of pores, the cellulosic material comprising wood including wood or wood composite materials, at least a portion of the pores containing a treating agent comprising: a polymer comprising a water soluble polyol; and a modifying agent comprising a hydrophobic polyalkylene polyol.

A method for preparing a treated cellulosic material comprising: providing a cellulosic material; a first treatment protocol comprising impregnating the cellulosic material with a polymer, the polymer comprising a water-soluble polyol; and a second treatment protocol comprising impregnating the cellulosic material with a modifying agent, the modifying agent comprising a hydrophobic polyalkylene polyol.

DETAILED DESCRIPTION

As used herein, the term "porous material" refers to a material which is permeable such that fluids are movable therethrough by way of pores or other passages. An example of a porous material is a cellulosic material. Other examples of porous materials include stone, concrete, ceramics, and derivatives thereof. As used herein, the term "cellulosic material" refers to a material that includes cellulose as a structural component. Examples of cellulosic materials include wood, paper, textiles, rope, particleboard and other biologic and synthetic materials. As used herein, wood includes solid wood and all wood composite materials (e.g., chipboard, engineered wood products, etc.). Cellulosic materials generally have a porous structure that defines a plurality of pores.

As used herein, unless otherwise indicated, the phrase "molecular weight" refers to the weight average molecular weight. In some instance, the molecular weight is measured by GPC (Gel permeation chromatography).

A "treated cellulosic material" is a cellulosic material that has been treated with a treating agent to modify the properties of the cellulosic material. The properties modified by the treating agent include, but are not limited to, increased hydrophobicity, dimensional stability, fungi resistance, insect resistance, hardness, surface appearance, UV stability, fire resistance, and coatability. Increasing the hydrophobicity of a cellulosic material can provide other ancillary benefits, such as dimensional stability, by reducing the rate of water adsorption and evaporation, thus reducing the internal stresses of expanding and contracting.

A "treating agent" is a substance that, when combined with the cellulosic material, modifies the properties of the cellulosic material. In one instance, the treating agent comprises both a polymer and a modifying agent. The treating agent is applied to the cellulosic material. One method of applying the treating agent to the cellulosic material is through impregnation using pressure treatment. In one instance, the polymer is applied to the cellulosic material as part of a solution. Other methods of applying the treating agent are known, such as brushing, spraying, dipping, soaking and extrusion. Once applied, the treating agent will permeate the surface of the cellulosic material.

As used herein, the use of the term "(meth)" followed by another term such as acrylate refers to both acrylates and methacrylates. For example, the term "(meth)acrylate" refers to either acrylate or methacrylate; the term "(meth)acrylic" refers to either acrylic or methacrylic; and the term "(meth)acrylic acid" refers to either acrylic acid or methacrylic acid.

As used herein, polymer refers to a molecule that is formed from one or more types of monomers.

In one instance, the polymer comprises a water-soluble polyol. As used herein, "water-soluble" means that the solution has at least 10 wt % of polyol in water without phase separation, precipitation, or solid residue. In one instance, the water-soluble polyol is a polymer having 2 or more hydroxyl groups. Examples of water-soluble polyols include, polyethylene glycol, polyvinyl alcohol, ethylene oxide/propylene oxide copolymer, ethoxylated glycerin, ethoxylated trimethylolpropane or ethoxylated sugars. In one instance, the water-soluble polyol is selected having a molecular weight of less than 10000. In one instance, the water-soluble polyol is selected having a molecular weight of less than 2000. In one instance, the water-soluble polyol is selected having a molecular weight of less than 1500. In one instance, the water-soluble polyol is selected having a molecular weight of at least 300. In one instance, a polyethylene glycol is selected having a molecular weight of less than 1000. CARBOWAX™ Polyethylene Glycol 1000 (The Dow Chemical Company) is an example of a commercially available polyethylene glycol. In the case of copolymers, it can be random, block, or a graft copolymer. As used herein, copolymer refers to a polymer formed by uniting two or more monomers. Examples of copolymers include bipolymers, terpolymers, tetrapolymers, and other higher-ordered copolymers.

In one instance, the polymer is a constituent part of an aqueous solution. In one instance, the solution is a medium that comprises the polymer, water, and optionally an organic solvent. The polymer solution is prepared such that the viscosity of the water-soluble polymer solution is suitable for penetrating the pores of the cellulosic material for distribution through the cellulosic material. In one instance, the viscosity of the solution is from 10 cP to 5000 cP at ambient temperature. In one instance, the viscosity of the solution is less than 500 cP at ambient temperature. In one instance, the water-soluble polymer solution also comprises one or more additives. In one instance, the polymer content of the solution is 1 to 75 weight percent. In one instance, the polymer content of the solution is 5 to 60 weight percent. In one instance, the polymer content of the solution is 10 to 55 weight percent. In one instance, the polymer content of the solution is 15 to 50 weight percent. In one instance, the polymer content of the solution is 25 to 45 weight percent. In one instance, the polymer content of the solution is 30 to 40 weight percent. In one instance the solution includes a solvent, for example, an organic solvent such as an oxygenated solvent, a hydrocarbon solvent, a halogenated solvent, or a combination thereof.

The modifying agent is a substance that, when added to the porous material, improves the properties of the porous material. In one instance, the modifying agent is a hydrophobic polyalkylene polyol. The hydrophobic polyalkylene polyol can be a copolymer of ethylene oxide ("EO"), propylene oxide ("PO"), or butylene oxide ("BO"), either random or block, or a polymer of PO or BO. Alternatively, the hydrophobic polyalkylene polyol can be an alcohol or phenol initiated polymer or copolymer of EO, PO, or BO, either random or block. Hydropohobic polyalkylene polyols useful in embodiments of the invention are polyether polyols initiated by one or more initiators selected from the group consisting of alcohols (i.e., monols), diols, and polyols. Exemplary monol initiators include methanol, ethanol, propanol, butanol, pentanol, hexanol, neopentanol, isobutanol, decanol, 2-ethylhexanol, and the like, as well as higher acyclic alcohols derived from both natural and petrochemical sources with from 11 carbon atoms to 22 carbon atoms. Exemplary diol initiators include monoethylene glycol, monopropylene glycol, butylene glycol, diethylene glycol or dipropylene glycol. Exemplary polyol initiators include glycerol, neopentyl glycol, trimethylolpropane, pentaerythritiol, or a sugar (e.g., sorbitol). Other hydrophobic polyalkylene polyols useful in embodiments of the invention include hydrophobic polybutadiene polyol, ethylene oxide/propylene oxide/butylene oxide copolymers, polypropylene glycol, polybutylene glycol, or polytetramethylene glycol. In one instance, the hydrophobic polyalkylene polyol has a molecular weight of less than 100,000. In one instance, the hydrophobic polyalkylene polyol has a molecular weight of less than 10,000. In one instance, the hydrophobic polyalkylene polyol has a molecular weight of 100 to 10,000. In one instance, the hydrophobic polyalkylene polyol has a molecular weight of 500 to 1,500. UCON™ OSP Base Oils (such as OSP-150 and OSP-32) are suitable hydrophobic polyalkylene polyols (available from The Dow Chemical Company). In one instance, the modifying agent is used neat.

In one instance, the modifying agent is a constituent part of a solution. In one instance, the solution is a medium that comprises the modifying agent and an organic solvent, for example, an oxygenated solvent, a hydrocarbon solvent, a halogenated solvent, or a combination thereof. Isopropanol, methanol ("MeOH"), dimethylformamide ("DMF"), and acetone are examples of suitable solvents. In one instance, the solution also comprises one or more additives. In one instance, the modifying agent content of the solution is 5 to 75 weight percent. In one instance, the modifying agent content of the solution is 10 to 75 weight percent. In one instance, the modifying agent content of the solution is 15 to 75 weight percent. In one instance, the modifying agent content of the solution is 20 to 75 weight percent. In one instance, the modifying agent content of the solution is 25 to 75 weight percent. In one instance, the modifying agent content of the solution is 30 to 75 weight percent. The modifying agent of neat hydrophobic polyalkylene polyol or modifying agent solution is prepared such that the viscosity of the modifying agent is suitable for penetrating the pores of the cellulosic material for distribution through the cellulosic material. In one instance, the viscosity of modifying agent is from 10 cP to 5000 cP at ambient temperature. In one instance, the viscosity of the solution is less than 500 cP at ambient temperature.

In one instance, the aqueous solution comprising the polymer is combined with the solution comprising the modifying agent to allow treatment of the porous material in a single step. When the solutions are combined, a suitable solvent is selected that is compatible with both solutions. Isopropanol, MeOH, DMF, and acetone are examples of suitable solvents.

The treating agent is combined with the cellulosic material. In one instance, the treating agent is introduced to the cellulosic material by pressure treatment, as described herein. In another instance, the treating agent is introduced to the cellulosic material by other techniques known in the art, for example, brushing, dipping, soaking, spraying, and extrusion. The treating agent becomes impregnated in at least a portion of the pores of the cellulosic material, and thereby increases the weight of the cellulosic material. In one instance, the polymer increases the weight of the cellulosic material by 1 to 80 percent (as calculated after drying the cellulosic material). In one instance, the treating agent—the combination of the polymer and the modifying agent—increases the weight of the cellulosic material by 5 to greater than 100 percent (as calculated after drying the cellulosic material).

In one instance, the treating agent comprises one or more additives. The additive may be included as part of the solution containing the polymer, as part of the modifying agent, or may be included separately therefrom. Additives which are known to add properties to treated cellulosic materials are suitable, such as, flame retardants, dispersants and/or dyes. For example, the additives may be organic compounds, metallic compounds, or organometallic compounds. In one instance, the additive is a material which improves the wetting or penetration of the polymer into the wood, for example, solvents or surfactants (anionic, cationic or nonionic) that are stable in the dispersion. Examples of additives include, solvents, fillers, thickeners, emulsifiers, dispersing agents, buffers, pigments, penetrants, antistatic agents, odor substances, corrosion inhibitors, preservatives, siliconizing agents, rheology modifiers, anti-settling agents, anti-oxidants, other crosslinkers (e.g. diols and polyols), optical brighteners, waxes, coalescence agents, biocides and anti-foaming agents. Such fillers may include silica, $Ca(OH)_2$ or $CaCO_3$. In addition, the treating agent may be used in conjunction with wood preservatives containing, for example, cupric-ammonia, cupric-amine, cupric-ammonia-amine complexes, quaternary ammonium compounds, or other systems. For example, the treating agent may be used with Alkaline Copper-Quaternary ammonium (ACQ) preservative systems. The treating agent may also be used with wood preservative technologies which use zinc salts or boron containing compounds. Optionally, other additives such as insecticides, termiticides, and fungicides may be added to the treating agent. In one instance, the additive is included as part of the dispersion and forms a stable suspension therewith. In one instance, one or more surfactant is added to the dispersion. In one instance, a surfactant is selected which reduces gelling of the polymer at the surface of the cellulosic material. In one instance, a surfactant is selected which increases the amount of polymer impregnated in the cellulosic material. For example, suitable surfactants may be nonionic, anionic, or cationic. Examples of nonionic surfactants include: alkoxylated alcohols, alkoxylated alkyl phenols, fatty acid esters, amine and amide derivatives, alkylpolyglucosides, ethylene oxide/propylene oxide copolymers, polyols and alkoxylated polyols. For example, a nonionic surfactant is TERGITOL™ L-62, commercially available from The Dow Chemical Company. Examples of anionic surfactants include: alkyl sulfates, alkyether sulfates, sulfated alkanolamides, alpha olefin sulfonates, lignosulfonates, sulfosuccinates, fatty acid salts, and phosphate esters. For example, an anionic surfactant is DOWFAX™ C10L, commercially available from the Dow Chemical Company. Examples of cationic surfactants include alkyltrimethylammonium salts.

In one instance, the cellulosic material is prepared as a treated cellulosic material by soaking at ambient pressure. In one instance, the cellulosic material is prepared as a treated cellulosic material by pressure treatment. The pressure used to pressure treat the cellulosic material may be either higher or lower than atmospheric pressure. In one instance, the pressure is lower than ambient pressure, for example, 0.0001 to 0.09 MPa (0.75 to 675 mmHg). In another instance, the pressure is greater than ambient pressure, for example, 0.1 to 1.7 MPa (750 to 12750 mmHg). It is envisioned that pressure treatment processes known in the art are suitable for impregnating the cellulosic material with the treating agent. The temperature for the pressure treatment may be performed at a range of temperatures, for example, from ambient to 150° C.

In one instance, the treated cellulosic material is prepared according to at least a first treatment protocol and a second treatment protocol. In one instance, the first treatment protocol comprises impregnating the cellulosic material with the polymer. The first treatment protocol comprises one or more of the following steps: (a) depositing the cellulosic material in a vessel; (b) holding the vessel at vacuum for 5 to 60 minutes; (c) introducing the polymer to the vessel; (d) pressurizing the vessel to 1.03 MPa for 5 to 60 minutes; (e) draining the excess polymer; (f) optionally removing excess polymer by vacuum and (g) air drying the cellulosic material at 20 to 60° C. for 24 to 48 hours. In one instance, the polymer is part of the aqueous dispersion. In one instance, step (d) is performed at ambient pressure.

In one instance, the product of the first treatment protocol is subsequently prepared according to a second treatment protocol that impregnates the cellulosic material with the modifying agent. The second treatment protocol comprises one or more of the following steps: (a) depositing the cellulosic material prepared according to the first treatment protocol in a vessel; (b) introducing the modifying agent to the vessel; (c) holding the vessel at either vacuum or increased pressure for 5 to 60 minutes; (d) optionally removing excess modifying agent by vacuum; and (e) air drying the cellulosic material at 60° C. for 24 to 48 hours.

In one instance, the first treatment protocol and the second treatment protocol are performed concurrently.

The several drying steps may be performed at a range of temperatures, whereby the duration of the air drying step is proportional to the temperature. Suitable air-drying temperatures are between room temperature (roughly 20° C.) and 180° C. The drying may be performed in air, in nitrogen, or other suitable atmosphere.

A water immersion test is used to determine the water repellency of the treated cellulosic material according to the American Wood Protection Association Standard E4-11 procedure (Standard Method of Testing Water Repellency of Pressure Treated Wood). The water immersion test involves first, providing both a treated wafer, comprising a treated cellulosic material prepared as described herein, and a control wafer, comprising a cellulosic material treated according to the first treatment protocol described herein except that the dispersion is replaced by distilled water; second, measuring the tangential dimension of both the treated wafer and the control wafer to provide an initial tangential dimension ($T_1$) (where the tangential dimension is perpendicular to the direction of the grain of the cellulosic material); third, placing both the treated wafer and the control wafer in a conditioning chamber maintained at 65±3% relative humidity and 21±3° C. until a constant weight is achieved; fourth, immersing both the treated wafer and the control wafer in distilled water at 24±3° C. for 30 minutes; and fourth, measuring the tangential dimension of both the treated wafer and the control wafer following removal from the water to provide a post tangential dimension ($T_2$).

DoN refers to the degree of neutralization of the carboxylic acid functionality in the polymer.

The percent swelling (S) for each individual wafer (both the treated wafer and the control wafer) is calculated as:

$$S(\%) = \frac{T_2 - T_1}{T_1} \times 100$$

In each of the Examples herein, the percent swelling of the control wafer is 3.0%.

Water-repellency efficiency (WRE) is used to determine the effectiveness of the treating agent in adding water repellant properties to the treated cellulosic material. WRE is calculated as:

$$WRE(\%) = \frac{S_1 - S_2}{S_1} \times 100$$

$S_1$ refers to the percent swelling of the untreated wafer; $S_2$ refers to the percent swelling of the treated wafer. According to E4-11, for most outdoor applications a minimum WRE of 75% is preferred.

The following Examples illustrate certain aspects of the present disclosure, but the scope of the present disclosure is not limited to the following Examples.

Materials

PEG 1000 is a commercially available polyethylene glycol available under the trademark CARBOWAX™ from The Dow Chemical Company. PEG 1000 is dissolved in water to give a 30 wt. percent solution. Referred to herein as "PEG 1000".

Isopropanol is commercially available from The Dow Chemical Company. Referred to herein as "IPA".

UCON™ OSP-150 is a commercially available hydrophobic polyalkylene glycol available from The Dow Chemical Company. In one instance, the OSP-150 is mixed with equal parts IPA to give a 50 wt. percent solution, referred to herein as "OSP-150 solution". In one instance, the OSP-150 is used neat, referred to herein as "neat OSP-150".

UCON™ OSP-32 is a commercially available hydrophobic polyalkylene glycol available from The Dow Chemical Company. The OSP-32 is mixed with equal parts IPA to give a 50 wt. percent solution. Referred to herein as "OSP-32 solution".

Wood Treatment. Five southern yellow pine blocks (4 cm*2 cm*0.5 cm) are provided, as labeled in Table 1, four are treated as described herein and one is a control. Four of the wood blocks are individually pressed down by a ring in an evacuated Parr reactor for half an hour followed by drawing in 80 ml of first treating agent defined in Table 1. The reactor is pressurized to 150 psi under nitrogen and maintained for 60 min. The impregnated wood blocks are then placed in an oven in air at 60° C. for 48 h.

The three treated wood blocks are each individually pressed down by a ring in an evacuated Parr reactor for half an hour followed by drawing in 80 ml of the second treating agent defined in Table 1. The reactor is pressurized to 150 psi under nitrogen and maintained for 60 min. The impregnated wood blocks are then placed in an oven in air at 60° C. for 48 h.

A leaching test is performed by washing the wood blocks with deionized water at 35° C. for 8 hours and then dried in an oven at 60° C. overnight. The dimensional stability of the dried wood is then conducted following the AWPAS E4-11 procedure, with results listed in Table 1.

TABLE 1

| Sample | First Treating Agent | Second Treating Agent | Percentage of swelling (Initial) | WRE (initial) | Percentage of swelling (leached) | WRE (leached) |
| --- | --- | --- | --- | --- | --- | --- |
| Control | None | None | | 0% | | 0% |
| 1 | PEG 1000 | None | 1.1% | 61.9% | 3.9% | −30.1% |
| 2 | PEG 1000 | Neat OSP-150 | −0.19% | 106.4% | 0.58% | 80.6% |
| 3 | PEG 1000 | 50% OSP-150 in IPA | 0.19% | 93.6% | 0.97% | 67.6% |
| 4 | PEG 1000 | 50% OSP-32 in IPA | 0% | 100.0% | 0.77% | 77.9% |

As the table above shows, and without being limited by theory, the use of a modifying agent (e.g., a hydrophobic polyalkylene polyol) which is used to form a protective layer around the pores of the wood, slows the extraction of the water soluble polyol (e.g., PEG 1000) from the cell wall by water, thus providing a significantly longer period of dimensional stability compared to a one-step treatment with a water soluble polyol.

The invention claimed is:

1. A method for preparing a treated cellulosic material comprising:
   (a) providing a cellulosic material;
   (b) a first treatment protocol comprising impregnating the cellulosic material with a polymer, the polymer comprising a water-soluble polyol wherein water soluble means that a water solution with the polyol will have at least 10 percent by weight of the polyol in water without phase separation, precipitation or solid residue; and
   (c) a second treatment protocol comprising impregnating the cellulosic material with a modifying agent, the modifying agent comprising a hydrophobic polyalkylene polyol.

2. The treated cellulosic material of claim 1, wherein the water soluble polyol is selected from the group of polyethylene glycol, polyvinyl alcohol, ethylene oxide/propylene oxide copolymer, ethoxylated glycerin, ethoxylated trimethylolpropane or ethoxylated sugars.

3. The method of claim 1, wherein the hydrophobic polyalkylene polyol is selected from the group of a random or block copolymer of ethylene oxide, propylene oxide, or butylene oxide; a polymer of propylene oxide or butylene oxide;
   polytetramethylene glycol; hydrophobic polybutadiene polyol; or an alcohol or phenol initiated random or block copolymer of ethylene oxide, propylene oxide, or butylene oxide.

4. The method of claim 1, wherein the first treatment protocol and the second treatment protocol are performed concurrently.

5. The method of claim 1, wherein the water-soluble polyol or the modifying agent or both, further comprise an additional solvent which solubilizes in part both the water soluble polyol and the hydrophobic polyalkylene polyol.

6. The method of claim 1, further comprising impregnating the cellulosic material with an additive.

* * * * *